Dec. 20, 1938.  E. C. AKERS  2,141,075
SIGNAL SWITCH
Filed Sept. 10, 1936
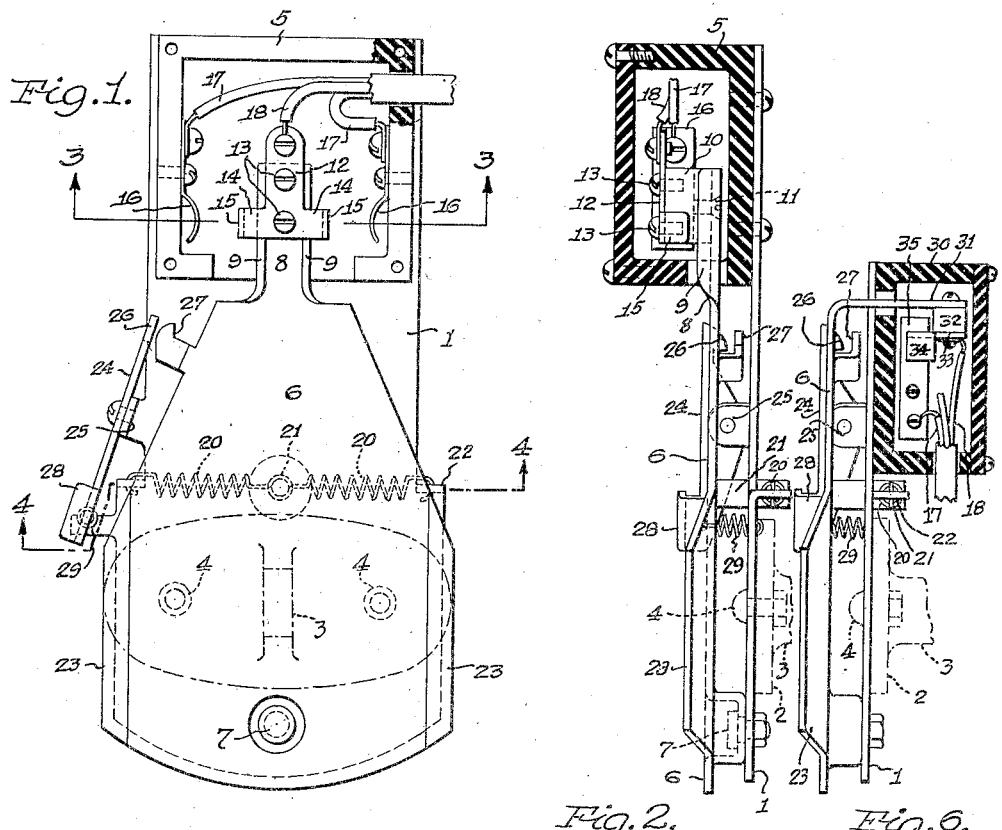
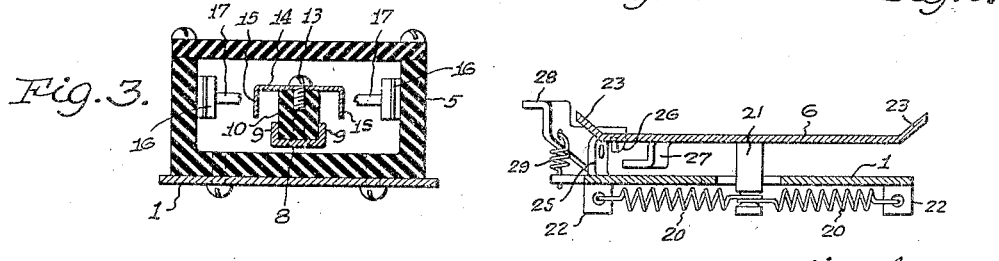
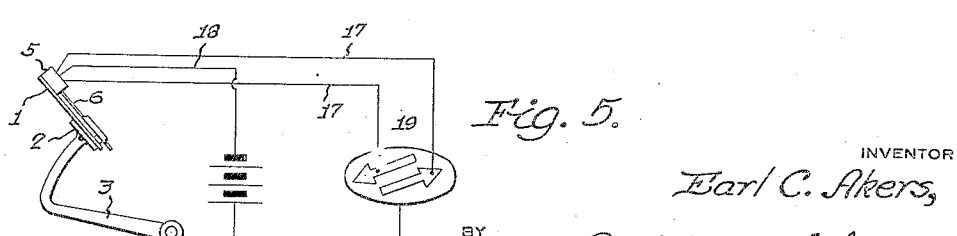
INVENTOR
Earl C. Akers,
BY
ATTORNEYS Patented Dec. 20, 1938

2,141,075

UNITED STATES PATENT OFFICE 2,141,075

SIGNAL SWITCH

Earl C. Akers, Detroit, Mich.

Application September 10, 1936, Serial No. 100,072

3 Claims. (Cl. 200—52)

This invention relates to switches especially adapted for use in connection with motor vehicle signal devices and an object of the invention is to provide a foot operated switch of simple construction which may be readily applied to a foot pedal of a motor vehicle. A further object is to provide a device for the purpose which is constructed and arranged to be operated by a lateral movement of the operator's foot relative to the vehicle pedal, in both directions to operate the signal device and indicate a right or left hand turn. It is also an object to provide a switch which may be readily attached to a foot pedal as a unit and the pedal then operated by the foot of the operator in the usual manner. It is also an object to provide a switch adapted to be pivotally attached to the tread of a pedal to swing laterally and to form a supplemental tread, which tread member may be locked in its operated position to hold said member in contact position with the circuit of the signal device closed whenever it is desirable to continue an indication of the signal device over a considerable period of time, as when the vehicle is pulled to the side of the road and stopped.

A further object is to provide certain other new and useful features in the construction, arrangement and combination of parts, all as hereinafter more fully set forth, reference being had to the accompanying drawing wherein Figure 1 is a plan view of the switch device illustrative of an embodiment of the present invention;

Fig. 2 is a side elevation of Fig. 1 with parts shown in section;

Fig. 3 is a transverse section substantially upon the line 3—3 of Fig. 1;

Fig. 4 is a transverse section substantially upon the line 4—4 of Fig. 1;

Fig. 5 is a diagrammatic view indicating a signal device and a foot pedal of the motor vehicle together with the wiring connections between the switch device attached to the pedal and said signal device, and Fig. 6 is a sectional side elevation similar to Fig. 2 and showing a slightly modified construction.

As shown in the accompanying drawing, 1 indicates a base plate which is adapted to be secured to the face of the tread 2 of an operating pedal 3 of the motor vehicle. This base plate is secured in any suitable manner as by bolts 4 flat against the upper surface of the pedal tread and this plate may be of considerably greater length than the length of the tread in an upwardly extended direction for the support at its upper end of a switch box 5 which is formed of insulating material and secured in any suitable manner to the base plate 1.

Attached to the base plate 1 is a supplemental tread plate 6 which is pivotally attached adjacent its lower end to the base plate 1 in any suitable manner as by a pivot bolt 7 located midway of the width of the lower end portion of the tread plate 6 so that this plate may swing laterally at its upper end about the pivot 7 and the upper end of said supplemental tread plate 6 is formed with a longitudinal extension arm 8 which is adapted to extend into the switch box 5 through a slot in the lower wall of said box. Upon this extended arm 7 within the switch box 5, is secured in any suitable manner, as by upturning the edges of the arm to form side flanges 9, an insulating block 10 which is placed between the flanges 9 and secured in place by a screw 11 passing through an opening in the arm and into said block. Upon this insulating block 10 is secured a contact plate 12 by means of screws 13 passing therethrough and into the block, and this plate 12 is formed with laterally extending arms 14, the outer ends of which are downturned to provide contact ears 15 which contact spring contact members 16 secured in any suitable manner to opposite side walls of the switch box 5, the free ends of said contacts 16 being bent inwardly from the side walls of the box to provide yielding contacts into engagement with which the contact ears 15 are brought by a swinging movement of the tread plate 6 about its pivot 7. Attached to these contacts 16 are leading-in wires 17, and attached in any suitable manner to the contact plate 12 mounted upon the arm 8 of said tread plate 6 is a wire or cable 18, these wires or cables being insulated and leading out of the switch box 5 and extended in any suitable manner to a signal device indicated as a whole at 19 in Fig. 5.

The supplemental tread plate 6 is normally held in midposition of its swinging movement by means of coiled springs 20 attached at their adjacent ends to a central post 21 secured to the lower side of the plate 6 and extending therefrom through an opening in the base plate 1, which base plate is formed with downturned ears 22 at opposite sides thereof for the attachment of the outer ends of the springs 20. These springs therefore exert a yielding force to normally hold the plate 6 in midposition of its swinging movement laterally of the base plate 1, with the upper end of said plate extending upwardly from the tread 2 of the pedal and in line therewith so that the pedal may be operated in the usual manner by the operator placing his foot upon the plate 6 directly opposite the pedal tread between upturned side flanges 23 on the lower end portion of said tread plate.

In operating a motor vehicle it may be found desirable for the driver to pull to the side of the road and stop for a considerable length of time, as when something goes wrong with the vehicle, and it may be desirable, as at night, that the signal be left in operation to indicate to oncoming vehicles that this vehicle has stopped and may be about to turn back into traffic along the street. The oncoming vehicle is thus warned and, to hold the warning signal in operation, the tread plate 6 is swung laterally to bring the contact 15 into engagement with the contact 16 and this contact is then maintained or held by locking the tread plate 6 in the position to which it is swung with the contacts engaged.

Such lock may consist of a lever 24 pivotally attached intermediate its ends to an upstanding lug 25 integral with one edge of the base plate 1 and the upper end of this lever 24 is formed with a hook 26 to hook into engagement with a lug 27 formed integral with the tread plate 6 and projecting from the edge thereof adjacent the upper end of the lever. The lower end of said lever 24 is formed with an upwardly extending portion 28, and the lever is normally held swung upon its pivotal support by means of a small coiled spring 29 with the hook end 26 of the lever out of the path of the lug 27 so that the plate 6 may be normally swung laterally without interference by the lever 24. But when it is desired to lock the plate 6 in the position to which it is swung with the contacts in engagement, this lever may be moved against the action of the spring 29 into the path of the lug 27 and will snap into engagement therewith when the plate is swung toward it and lock therewith to hold the plate with said contacts in engagement and with the signal light lighted. When the driver takes his position within the vehicle to drive away, he places his foot upon the tread plate 6 and at the same time presses with his foot downwardly upon the end 28 of the lever 24, thus releasing said lever from engagement with the lug 27 and allowing the tread plate to be swung to midposition by the springs 20.

The modified construction shown in Fig. 6 is substantially the same as that shown in the other views with the exception that the switch box 30 is secured to the base plate 1 beneath the upper end portion of said plate and the extended arm 31 of the tread plate 6 is bent downwardly and extended through an opening in the base plate and wall of the switch box. Within the switch box 30 this extended arm 31 is provided with an insulating block 32 to which the contact plate 33 is secured with the contact lugs 34 of said plate in a position to engage side spring contacts 35 within the box, the wires 17 and 18 being operatively connected with the contacts 35 and 34 respectively.

With this pedal switch the usual pedal of the motor vehicle may be operated exactly the same as when the switch is absent, and this switch as a unitary device may be quickly applied to any pedal tread without change in the pedal, and when so applied the switch may be very conveniently operated by a simple side movement or pressure applied laterally of the plate 6 to swing this supplemental tread plate and bring the switch contacts into engagement to signal either to the right or left as desired. This switch may therefore be applied to any operating pedal of the motor vehicle without change either in the switch or the pedal and the switch device is of simple construction and efficient in operation.

Having thus fully described my invention what I claim is:

1. A device for the purpose described comprising a base plate, a tread plate attached to said base plate for movement laterally relative thereto, contacts carried by said laterally movable tread plate, an enclosing switch box carried by said base plate, said tread plate being formed with an extension projecting into said switch box and carrying said contacts, contact members within said switch box in opposed relation to said contacts carried by said extension of said tread plate, and yieldable means for normally holding said tread plate in midposition of its swinging movement with its contacts out of engagement with said contacts in said switch box.

2. A device as characterized in claim 1, and including locking means carried by said base plate to engage said tread plate adjacent one side edge thereof and hold the same in the position to which it is swung against the action of said yielding means with one of the contact members carried thereby in contact with one of the contact members in the switch box, said locking means being releasable by the operator's foot to permit said yieldable means to swing said tread plate to midposition and automatically separate said contacts and break the circuit.

3. A switch device for attachment to the tread portion of a pedal, said device including a base plate for attachment to the tread surface of the tread member of the pedal, a tread plate pivotally attached adjacent its rear end to said base plate to swing laterally thereof and having a forward end extension, yieldable means for normally holding said tread plate in midposition of its swinging movement, a switch box carried by the forward end of said base plate, contact members carried by said extension within said switch box, contact members within said switch box at opposite sides of and normally out of contact with said contacts on said tread plate extension when said tread plate is in midposition, and leading-in wires connected to said contact members in said switch box with one of said wires connected to said contact means on said extension.

EARL C. AKERS.